Figure 1:
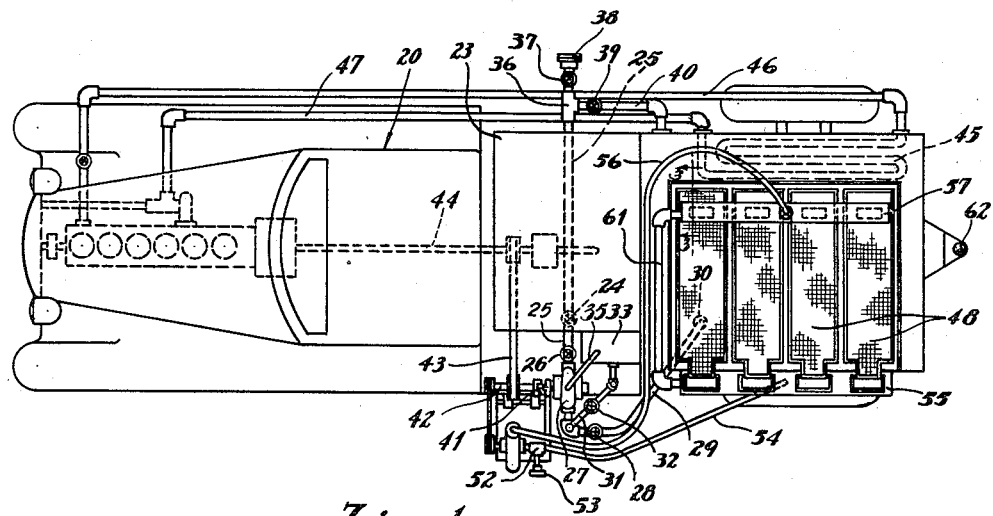

Aug. 30, 1949.　　　　A. PAUL, JR　　　　2,480,600
CATTLE SPRAY

Filed June 28, 1945　　　　　　　　　　6 Sheets-Sheet 1

*Inventor*
ALFRED PAUL JR.

By *Clarence A. O'Brien
and Harvey B. Jacobson*
　　　　　　　　*Attorneys*

Aug. 30, 1949.    A. PAUL, JR    2,480,600
CATTLE SPRAY
Filed June 28, 1945    6 Sheets-Sheet 3

Inventor
ALFRED PAUL JR.

By *Clarence A. O'Brien and Harvey B. Jacobson*
Attorneys

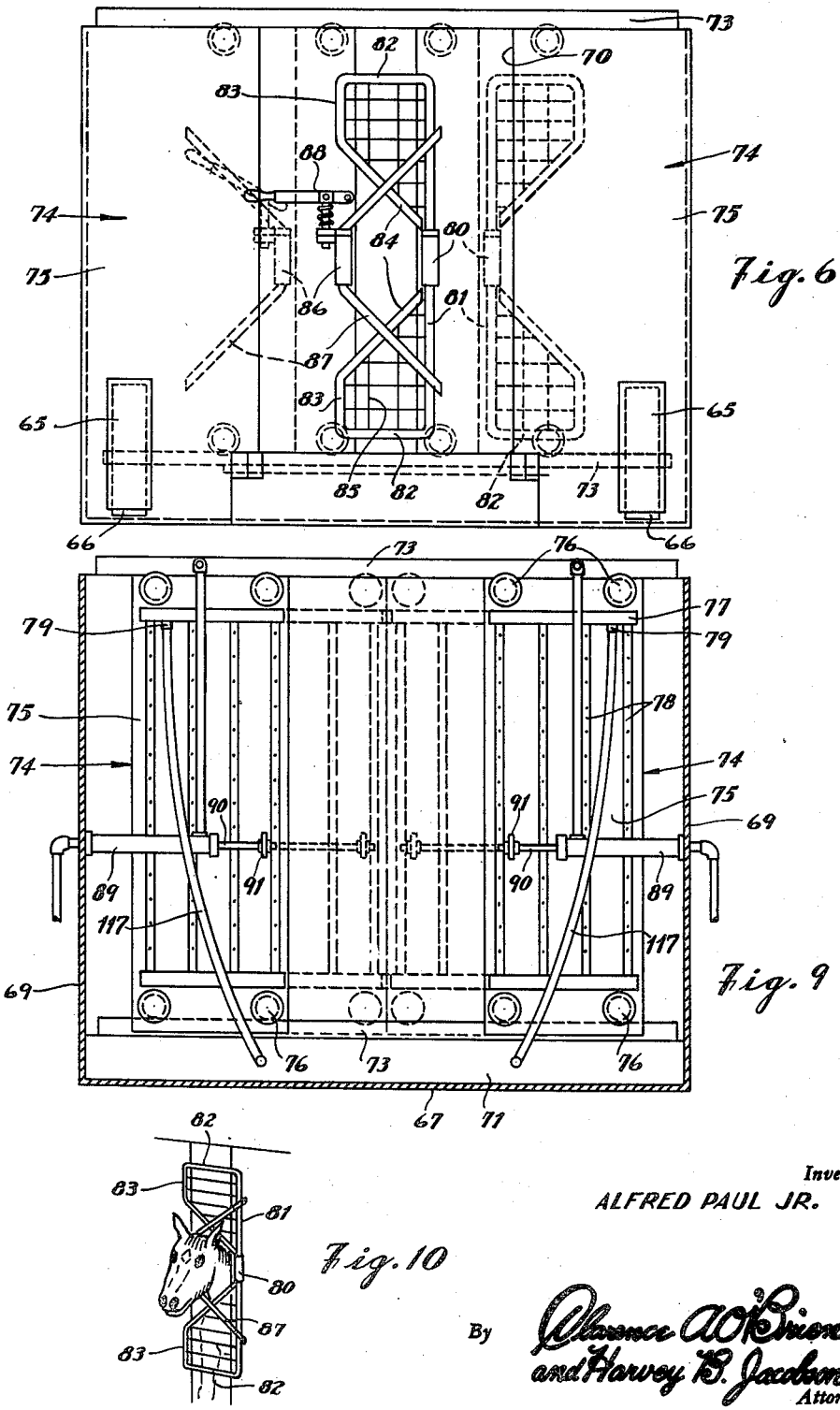

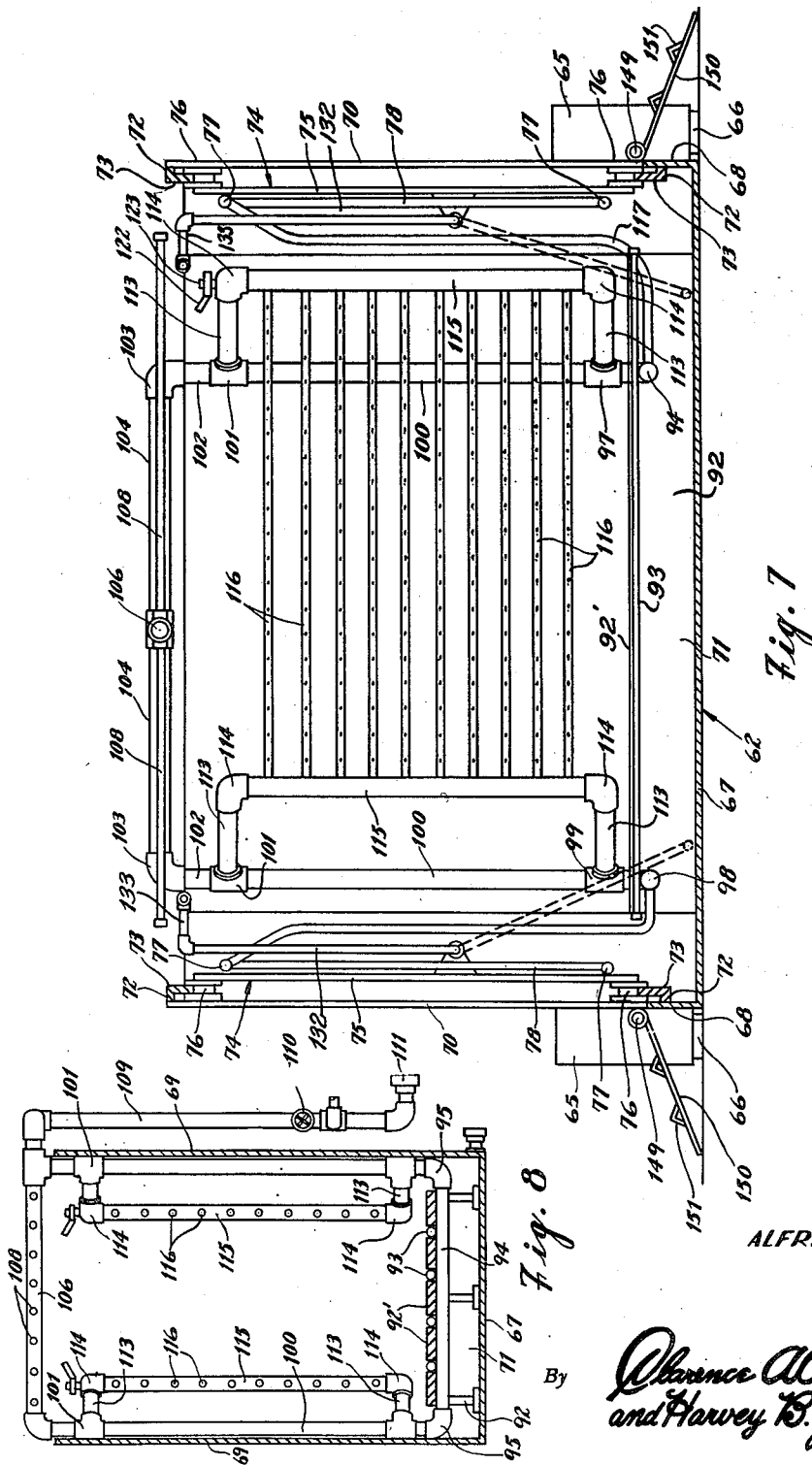

Aug. 30, 1949.  A. PAUL, JR  2,480,600
CATTLE SPRAY
Filed June 28, 1945  6 Sheets-Sheet 6

Inventor
ALFRED PAUL JR.

By Clarence A. O'Brien
and Harvey B. Jacobson
Attorneys

Patented Aug. 30, 1949

2,480,600

UNITED STATES PATENT OFFICE 2,480,600

CATTLE SPRAY

Alfred Paul, Jr., Paul Spur, Ariz.

Application June 28, 1945, Serial No. 601,973

2 Claims. (Cl. 119—159)

This invention relates to a cattle spray and more particularly to portable spraying equipment.

In the practice of animal husbandry, it is a common procedure periodically to subject the cattle to treatment with a disinfecting solution and to this end the practice of cattle dipping, i. e., causing an animal to swim through a large vat containing the disinfecting solution, has been resorted to. Such a procedure required that large herds of cattle be driven across country to a dipping vat where the dipping progressed until all of the cattle had been processed. With the consummation of the dipping, it became necessary to discard the liquid bath contained within the vat with the resultant waste of the disinfecting solution.

Due to the fact that the animals were required to swim in the liquid bath, their heads were seldom subjected to the treatment and no solution was ever gotten into the ears, with the result that the disinfecting of an animal was never complete.

The primary object of the present invention is to subject an animal to a thorough and complete disinfecting treatment.

Another object is to effect economies in the disinfecting process.

A further object is to avoid the necessity of conducting large herds of animals for long distances across country in order to conduct the disinfecting treatment.

The above and other objects may be attained by employing my invention which embodies among its features a portable cage in which an animal temporarily may be confined and subjected to sprays of treating liquid.

Other features embody a stock for holding the head of an animal confined in the cage so that treating liquid may be sprayed over the head and into the ears.

Still other features include a tractor truck to which the cage may be attached for transportation from place to place, tanks or reservoirs carried by the truck for containing the treating liquid under pressure, pumps for forcing the treating liquid into the tanks, flexible means for supplying liquid under pressure to spray jets carried by the cage and for collecting any excess liquid and returning it to the tank or tanks on the truck and various controls by which the flow of the liquid to and through the various parts of the cage is governed.

Figure 2:
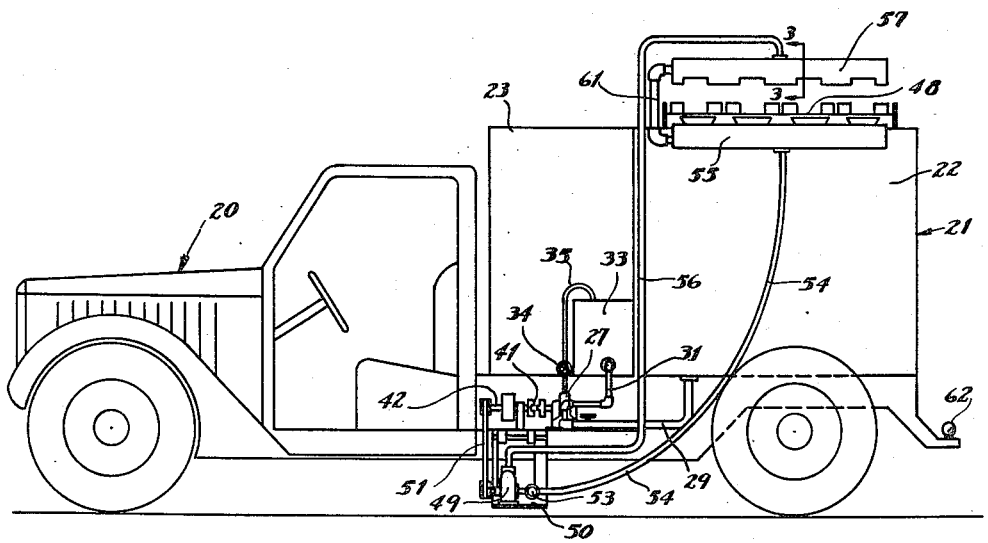
Figure 3:
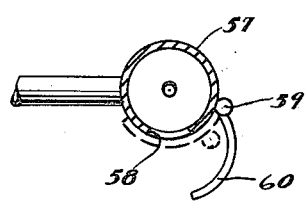
Figure 4:
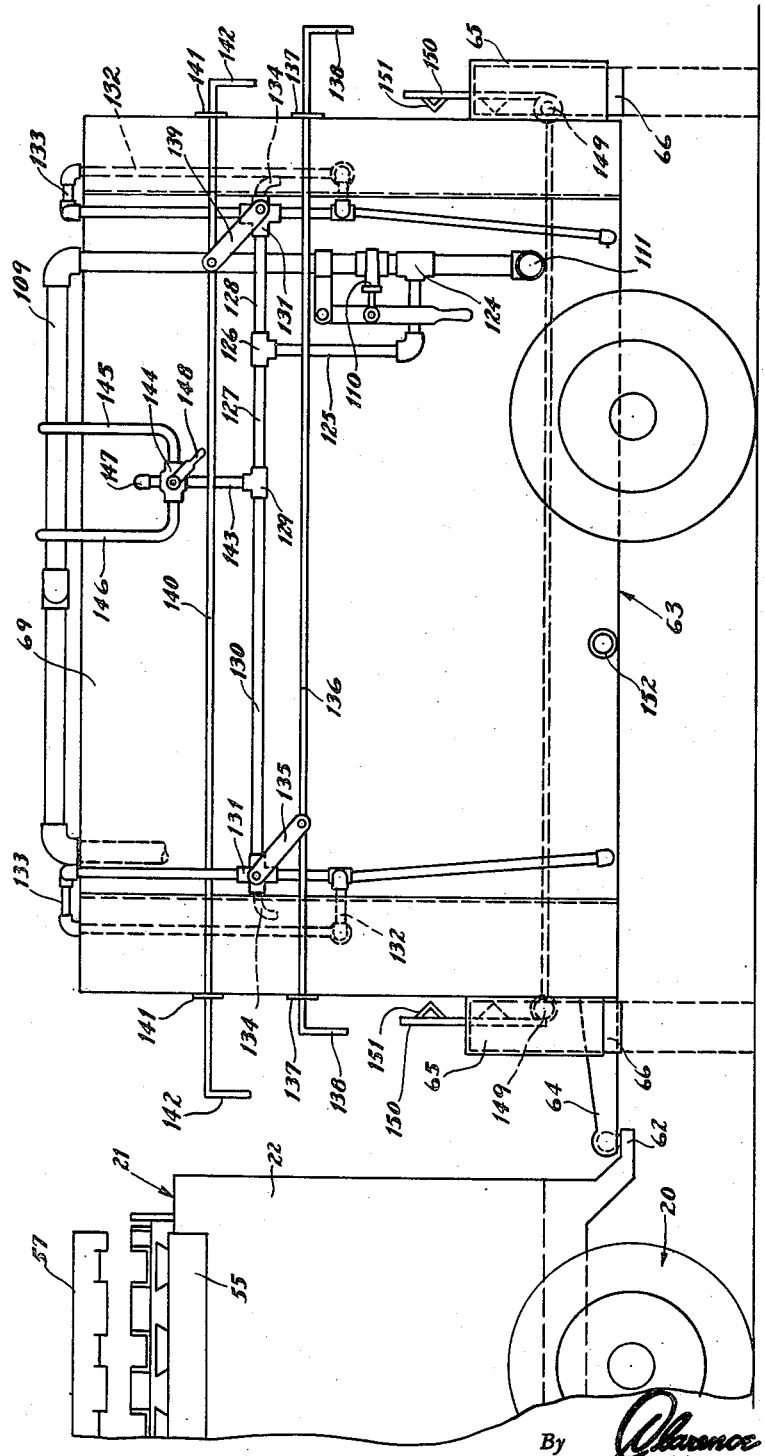
Figure 5:
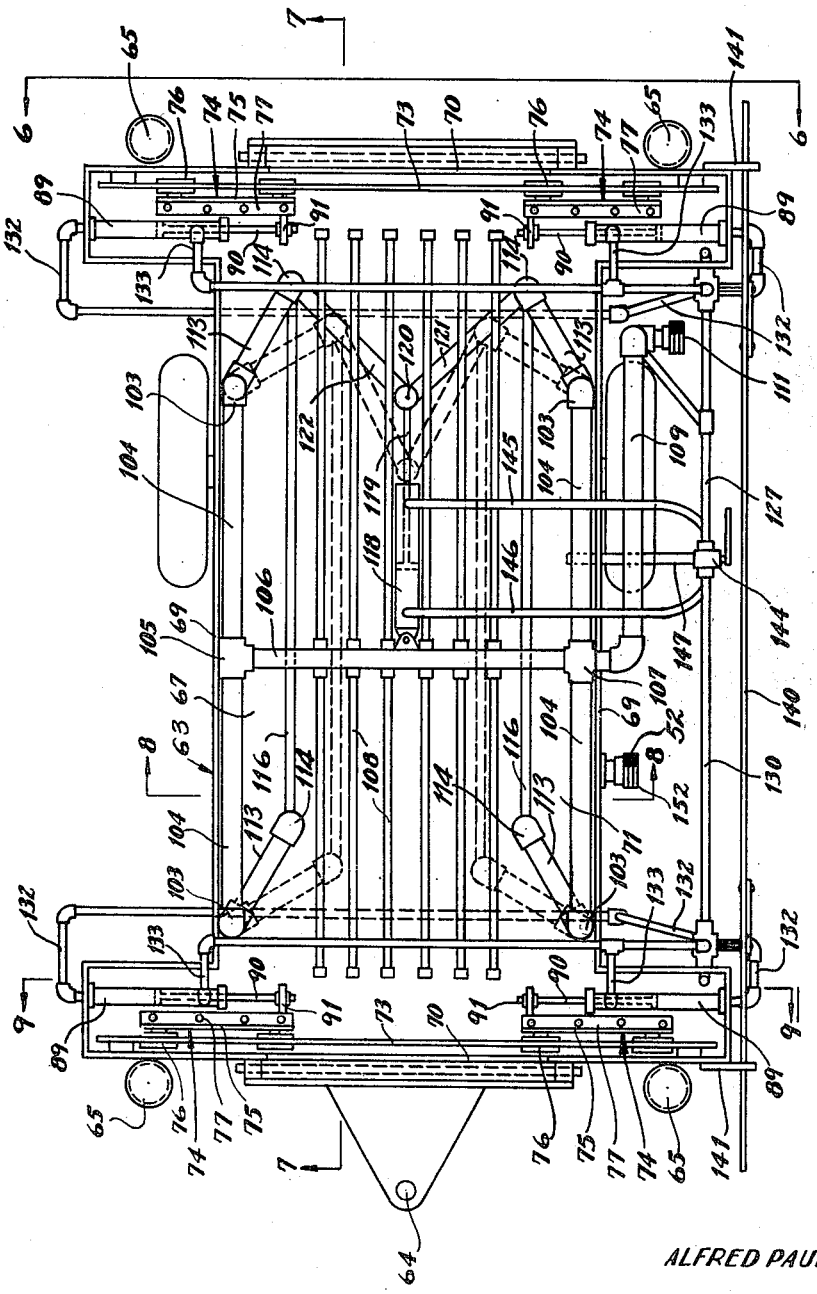

In the drawings:

Figure 1 is a top plan of a tractor truck equipped with the storage and pressure tanks, pumps and piping incident to my invention, Figure 2 is a side view in elevation of Figure 1, Figure 3 is a transverse sectional view taken on the line 3—3 of Figure 2, Figure 4 is a side view in elevation of an animal confining cage embodying my invention shown hitched to the tractor truck and ready for transportation, Figure 5 is a top plan view of Figure 4, the tractor truck being omitted, Figure 6 is an end view of the cage as viewed along the line 6—6 of Figure 5.

Figure 11:
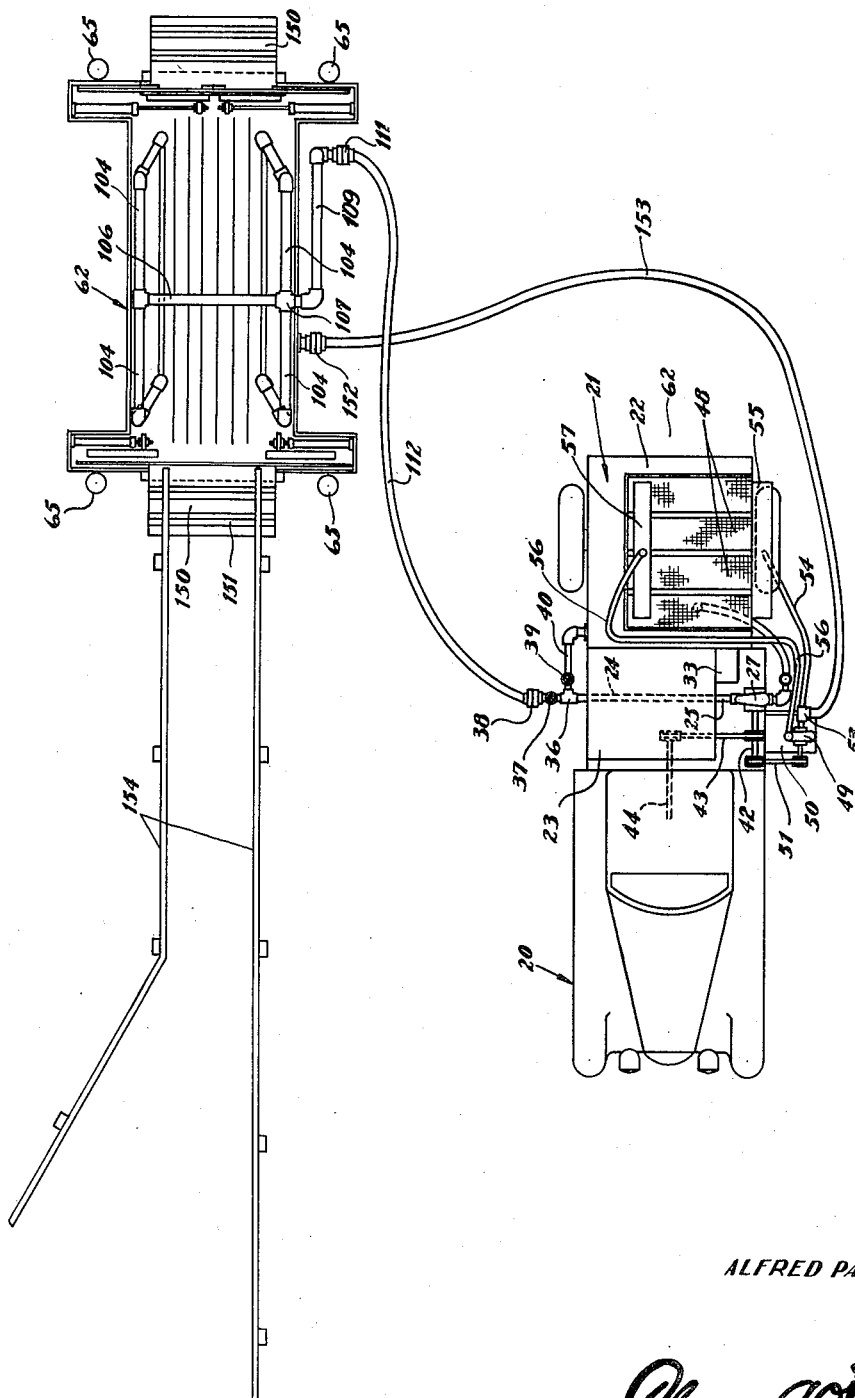

Figure 7 is a longitudinal sectional view taken substantially on the line 7—7 of Figure 5, Figure 8 is a transverse sectional view taken substantially along the line 8—8 of Figure 5, Figure 9 is a view similar to Figure 8 but taken substantially on the line 9—9 of Figure 5, Figure 10 is a fragmentary perspective view of the head-holding stock, and Figure 11 is a plan view of the cage and tractor truck showing them prepared for the spraying of a group or herd of animals.

Referring to the drawings in detail, a tractor truck designated generally 20 is provided with a tank body designated generally 21 which is divided into two separate compartments 22 and 23, the former serving merely as a storage tank for the spraying liquid while the latter serves as a pressure tank from which the liquid is adapted to be discharged under pressure. The pressure tank is wholly closed except for an inlet and discharge opening 24 to which a pipe 25 is connected. This pipe is connected through a valve 26 to the discharge end of a high pressure pump 27, the inlet or suction side of which is connected through a valve 28 and suction pipe 29 to a discharge outlet 30 in the bottom of the storage tank 22. Opening into the suction pipe between the valve 28 and the pump 27 is a pipe 31 which leads through a valve 32 to the lower end of a preliminary solution mixing tank 33 and establishing communication between the upper end of said tank 33 and the pump 27 through a valve 34 is a pipe 35. The pipe 25 extends transversely of the truck, as shown, and the end opposite that connected to the pump 27 is provided with a T connection 36, one leg of which is connected through a valve 37 to a coupling 38. The other leg or branch of the T 36 is connected through a valve 39 to a pipe 40 which opens through one side wall into the tank 22 near its bottom. It will thus be seen that when the pump is driven and the valves 28 and 39 are open and the valve 37 is closed, solution will be circulated from the storage tank 22 through pipe 29, pump 27, pipe 25 and through pipe 40 back to the storage tank. Such circulation of the liquid creates agitation therein and serves to insure its thorough mixing. In order to effect a preliminary mixing of the liquid, valves 26 and 28 are closed and the valves 32 and 34 are opened so that the solution in the lines is circulated through the preliminary mixing tank 33.

As illustrated in Figure 1, the pump 27 is adapted to be driven by clutch 41 on shaft 42 which, in turn, is driven through the medium of a belt 43 from the main drive shaft 44 of the truck 20. It will thus be seen that the pump may be operated when the vehicle is in transit so that the pressure tank 23 may be charged with liquid under pressure. This is accomplished after a satisfactory mixing of the liquid has taken place, as previously described, by closing valve 39. Such closing of valve 39 arrests the circulation of the liquid through the storage tank 22 and causes it to enter the opening 24 in pressure tank 23. The operation of the pump 27 causes the liquid to rise in the tank 23 and compress the air contained therein between the surface of the liquid and the top of the tank. In actual practice, it has been found that when the air in the tank has been compressed to about one-fifth of its original volume a pressure amounting to about eighty pounds per square inch will have been attained. When the desired pressure has been reached, the valve 26 is closed and the clutch 41 is manipulated so as to discontinue further operation of the pump.

Mounted within the tank 22 are suitable heating coils 45, the terminals of which are connected through pipes 46 and 47 to the cooling system of the engine of the truck 20 so that hot water may be circulated through the coils 45 to warm the contents of the tank 22.

Mounted above the open, upper side of the tank 22 are inclined filter screens 48 which are designed to separate hair and like debris from liquid reclaimed during the animal-spraying operation. In order to elevate such reclaimed liquid for discharge onto the filter screens, a pump 49 is mounted on a platform 50 which is mounted to swing upwardly and out of the way when the truck is in transit. The drive-shaft of the pump 49 has driving connection through a belt 51 with a drive pulley carried by the shaft 42. Connected to the intake side of the pump 49 is a T 52, one branch or leg of which carries a coupling 53 while the other branch is connected through a flexible duct or pipe 54 with a drainage trough 55 mounted on one side of the tank 22 beneath the lower ends of the filter screens 48. Leading from the discharge side of the pump 49 is a flexible tube or hose 56, the opposite end of which leads to a header or manifold 57 positioned above the upper ends of the filter screens 48. This header or manifold 57 is provided at spaced intervals with downwardly disposed openings 58 adjacent each of which is hinged, as at 59, a cover or door 60 to regulate the flow of fluid through their respective openings. A pipe 61 connects one end of the manifold 57 with the trough 55, as will be clearly seen in Figures 1 and 2.

A trailer hitch 62 is carried at the rear end of the truck 20 to which the animal-spraying cage, to be more fully hereinafter described, is adapted to be connected when in transit.

As a component part of my animal-treating equipment, I employ an animal confining and spraying cage designated generally 63 and best illustrated in Figures 4 through 10, inclusive.

This cage takes the form of a two-wheeled trailer vehicle comprising a frame or under-carriage carrying at its forward end a coupling 64 which, when the equipment is in transit, is adapted to be attached to the trailer hitch 62 previously described.

Attached to all four corners of the frame of the trailer vehicle are hydraulic cylinders 65 which are provided with vertically operating pistons 66 which are adapted to be projected downwardly as suggested by the dotted lines in Figure 4 to lift the trailer off the wheels to permit the latter to be removed when the cage is in operation. These cylinders 65 and pistons 66 form, in effect, hydraulic jacks to effect the raising and lowering of the cage after it has been moved to the desired location for animal spraying. Any suitable source (not shown) of fluid under pressure may be employed to manipulate the jacks in raising and lowering the cage.

Carried by the frame to which the wheels and jacks are attached is a bottom 67 having at its ends upstanding end walls 68 and along its side edges upwardly extending side walls 69, which cooperate with the bottom to form an enclosure in which an animal to be processed is confined. Formed in the end walls 68 are door openings 70, the lower ends of which terminate short of the bottom 67 to form a shallow catch basin 71, the purpose of which will presently appear. Carried on suitable brackets 72 secured to the inner faces of the end walls at the top and bottom of the door openings 70 are transversely extending tracks 73 upon which doors designated generally 74 are hung.

Each door 74 comprises a door panel 75 carrying on its outer face at its upper and lower ends grooved rollers 76 which ride on the tracks 73 to enable the doors to be readily opened or closed. Secured to the inner face of each door panel near its upper and its lower end is a header 77, and extending vertically between the headers are spaced, parallel spray pipes 78, the spray jets of which are directed inwardly toward the interior of the cage. The uppermost header 77 on each door panel 75 is provided, near one end, with a suitable coupling 79 (Fig. 9), for a purpose to be more fully hereinafter described.

Mounted on the outside face adjacent the innermost edge of one door panel 75 at each end of the cage and at a point about midway of its upper and lower end is a vertically extending sleeve 80. Mounted for pivotal movement in the sleeve 80 is a vertically extending bar 81 carrying at its upper and lower ends horizontally extending bars 82, the outer ends of which are turned toward one another to form vertically extending bars 83 terminating at their inner ends in diagonal arms 84. Supported by the bars thus arranged and serving to bridge the spaces thus formed adjacent opposite ends of the bar 81 is a suitable screen 85. Mounted on the outer face of the adjacent door panel 75 is a sleeve 86 in which a substantially V-shaped bar 87 is pivotally mounted. When the doors 74 are held in partly opened position, as illustrated in Figure 6, and the bars 81 and 87 are swung into the position shown to partly close the space between the doors, the structure forms a stock for holding the head of an animal, as suggested in Figure 10, to facilitate the spraying of the head and ears with a hand spray. A suitable latch 88 is provided for holding the bars in such position.

Mounted on the side walls 69 are horizontally disposed cylinders 89 containing hydraulically actuated pistons to which piston rods 90 are attached. The outer ends of these pistons are secured to brackets 91 carried by the door panels 75. The cylinders 89 are provided near opposite ends with openings through which fluid may be admitted or discharged so as to move the pistons and the doors to which the piston rods are attached according to the desires of the operator.

Suppported on suitable I-beams 92 (Fig. 8) extending longitudinally of the cage 74 is a floor composed of spaced, longitudinally extending strips 92', between which spray pipes 93 are disposed. These are arranged with their jets directed upwardly and are connected to a transversely extending header 94 carrying at opposite ends vertically directed elbows 95 to which T's 97 are swivelly connected. A similar transversely extending header 98 carrying upturned elbows at opposite ends is located near the opposite end of the cage and swivelly mounted on these elbows are T's 99. A vertically extending pipe 100 extends upwardly from each T 97 and 99 and each such pipe carries at its upper end a T 101 which is swivelly connected to a nipple 102, the upper end of which carries an elbow 103. These elbows 103 are connected by horizontally disposed pipes 104 which extend longitudinally adjacent the upper edges of the side walls 69 to a point about midway of the cage. The pipes 104 on one side of the cage are connected by a T 105 to one end of a transversely extending header 106 while the pipes 104 on the opposite side of the cage connect to the header 106 by means of a cross 107. Extending longitudinally of the cage in spaced, parallel relation from opposite sides of the header 106 are overhead spray pipes 108 carrying downwardly directed spray jets. An elbow is connected to the cross 107 and is in turn connected to a lead pipe 109 carrying a valve 110, and terminating in a coupling 111 to which a hose 112 (Fig. 11) leading from the coupling 38 on the pipe 25 is adapted to be attached.

Extending horizontally from each T 97, 99 and 101 is a nipple 113 carrying, at its outer end, an elbow 114. A header 115 is swivelly mounted between each vertically aligned pair of elbows 114 and extending between the longitudinally spaced headers 115 on each side of the cage are horizontally disposed vertically spaced spray pipes 116, the spray jets of which are directed inwardly toward those on the opposite side of the cage. Leading from each of the headers 94 and 98 near opposite ends are flexible pipes or hoses 117, the opposite ends of which are connected to the couplings 79 carried by the doors 74.

Mounted on the header 106 between the centermost pair of spray pipes 108 is a cylinder 118 in which a piston carrying a piston rod 119 is adapted to work. The outer end of the piston rod is pivotally connected at 120 to links 121 and 122, the opposite ends of which are pivoted, as at 123, to the uppermost elbows 114 at one end of the cage in such a manner that when the piston within the cylinder 118 is moved the spray pipes 116 on one side of the cage will be moved toward or away from those on the opposite side. In this way, the space between the spray pipes 116 to be occupied by an animal may be varied.

Arranged in the pipe 109 between the valve 110 and the coupling 111 is a T 124 to which a fluid pressure distributing pipe 125 is connected. This pipe 125 is connected by a T 126 to branch pipes 127 and 128 and the pipe 127 is connected through a T 129 to a horizontally extending pipe 130. A four-way valve 131 is connected to the end of each pipe 128 and 130 and one branch of each valve is connected by pipes 132 leading to the outer ends of the cylinders 89 at the end of the cage adjacent the respective valves. Another branch of each valve is connected through pipes 133 to the inner ends of the cylinders 89 while the fourth branch of each valve is provided with a downturned discharge pipe 134. An operating lever 135 is connected to the valve 131 at one end of the cage 62 and pivoted to the free end of this lever is a horizontally disposed push rod 136 which is arranged to slide longitudinally of the cage 62 in brackets 137 secured to opposite end walls 68. An angularly extending handle 138 is carried at each end of the push rod 136 so that the valve 131 to which the lever 135 is connected may be manipulated from either end of the cage. Attached to the valve 131 at the opposite end of the cage 62 is a lever 139, which, like the lever 135, is pivoted to a push rod 140 which is also movable longitudinally in brackets 141 carried by opposite end walls of the cage. Like the rod 136, the rod 140 is also provided at opposite ends with angularly disposed handles 142. It will thus be seen that when the rod 140 is moved, the valves at the right-hand end of the cage in Figure 4 will be manipulated to admit fluid under pressure to the cylinders 89 at the right-hand end of the cage and thus cause the doors 74 at the right-hand end of the cage to open or close, as the case may be. In a like manner, the doors 74 at the left-hand end of the cage 62 are controlled by rod 136.

Extending vertically from the T 129 is a pipe 143, to the upper end of which is connected a four-way valve 144, to opposite sides of which are connected branch pipes 145 and 146 leading, respectively, to the forward and rear ends of the cylinder 118 (Fig. 5). A discharge pipe 147 leads from the valve 144 to the interior of the cage 62 so that liquid expelled from the cylinder 118 will be returned to the system. The valve 144 is controlled by a hand ever 148 mounted on the side thereof.

Pivotally mounted, as at 149, at each end of the cage immediately below the door openings 70 is a ramp 150 carrying on its upper surface cleats 151. Opening through the side wall of the cage 62 and into the basin 71 adjacent the bottom 67 is a drain passage to which a coupling 152 is connected. This coupling serves to detachably connect a hose 153 to the basin 71 so that treating liquid collected in the basin may be returned to the storage tank 21 on the tractor truck 20 by means of pump 49.

In operation it is assumed that the cattle-spraying equipment is in transit and is to be prepared for a cattle-spraying operation. In these circumstances, the clutch 41 is manipulated to throw the pump 27 into operation. The valves 26 and 28 are first closed and the valves 32 and 34 are opened, this allowing the liquid in the preliminary mixing tank 33 to be circulated through the pump 27 and to become thoroughly mixed. The discharge valve 37, it will be understood, is always closed when the equipment is in transit. After a thorough mixing of the small quantity of treating liquid in the tank 33 has been accomplished, the valves 26, 28 and 39 are opened and the valves 28 and 34 are closed. This establishes circulation of the liquid through the storage tank 22 in which a larger quantity of liquid is circulated and mixed. Having completed the mixing, the valve 34 is closed so that the liquid discharged from the pump 27 is forced to rise in the pressure tank 23 through port 24. In actual practice, it has been found that when the liquid rises in the pressure tank until it is about four-fifths full, the air in the upper portion of the tank will exert a force of about eighty pounds per square foot. Experience has taught that this is sufficient pressure for most purposes and when this condition is reached, the valves 26 and 39 are closed and the operation of the pump 27 is discontinued by disengaging the clutch 47.

Upon arriving at the location where the cattle are to be treated, plungers 66 are lowered as suggested by the dotted lines in Figure 4, and upon contacting the ground they exert a lifting pressure on the cage so as to lift the wheels clear of the ground. The wheels are then removed and the pistons 66 are allowed to telescope into the cylinders 65 until the cage is lowered into operating position. The ramps 150 are next swung into operative position, as shown in Figure 7, and the cage is ready for operation. In most instances, it will be found desirable to construct a crowd chute 154 (Figure 11), into which the animals to be processed are driven and through which they enter the cage 62 one at a time. The flexible hoses 112 and 153 are next connected, as shown in Figure 11, so that the coupling 38 carried by the pressure pipe 25 of the traction vehicle 20 is connected through hose 112 to the coupling 111 on the cage 62. The drainage return coupling 152 is connected by hose 153 to the coupling 53 on the drainage return pump 49. Upon opening the valve 37, liquid under pressure will flow from the pressure tank 23 through pipe 24, T 36, valve 37 and coupling 38 into the hose 112, from whence it enters the coupling 111 and flows upwardly in pipe 109 to valve 110. Liquid under pressure also flows into distribution pipe 125 and through its various branches to the valves 131 and 144. Manipulation of these valves causes the pistons in the cylinders to be moved as previously explained. In the present instance, the doors at the right-hand end of the cage in Figure 11 are closed and after an animal enters the cage from the opposite open end, the doors at that end are closed. Having thus confined the animal, the valve 110 is opened to allow the liquid to flow through the various spray pipes so as to thoroughly shower the animal from all angles. The excess liquid drains into the catch basin 71 and is conducted through coupling 152, hose 153 and coupling 53 to the pump 49 from whence it is forced through pipe 56 to the manifold 57 from which it is discharged through the openings 58 onto the filter screens 48 from whence it flows back into the storage tank 22. Any hair or debris collected by the fluid draining from the spray tank 62 will be pumped with the liquid onto the filter screens 48 and thus separated from the fluid which flows by gravity through the interstices thereof back into the tank 22. Should a screen 48 become so filled with debris that the fluid cannot return to the tank 22, the fluid flowing over the screen is caught in the trough 55 and returned to the pump 49 through the hose 54. In event that the volume of fluid entering the manifold 57 exceeds the capacity of the openings 58 to discharge it, the fluid may be returned to the pump 49 via the pipe 61, trough 55 and line 54. It is to be understood, of course, that if so desired, the pump 27 may be set into operation while the spraying is in progress and by opening the valves 26 and 28 liquid will be pumped to the cage and the supply in the pressure tank 23 will be conserved. In such event, the pump serves as a booster in the system. When the animal spraying has been completed, the cage may again be elevated on the plungers 66, the wheels restored and the cage hitched to the tractor truck ready for travel to the next location.

While in the foregoing there has been shown and described the preferred embodiment of this invention, it is to be understood that minor changes in the details of construction and combination and arrangement of parts may be resorted to without departing from the spirit and scope of the invention as claimed.

Having thus described the invention, what is claimed as new is:

1. In animal spraying apparatus a source for supplying animal treating liquid under pressure, a cage for confining an animal to be sprayed, said cage having animal admitting doorways opening thereinto, doors carried by the cage for closing said doorways, hydraulic means in the cage and connected to the doors for opening and closing said doors, an adjustable spray system in the cage, and means connecting the hydraulic door opening and closing means and the spray system with the source of liquid.

2. In animal spraying apparatus a source for supplying animal treating liquid under pressure, a cage for confining an animal to be sprayed, said cage having animal admitting doorways opening thereinto, doors carried by the cage for closing said doorways, hydraulic means in the cage and connected to the doors for opening and closing said doors, an adjustable spray system in the cage, means connecting the hydraulic door operating means and the spray system with the source of liquid, a bottom in the cage for collecting spray liquid which drips from an animal being sprayed and means for returning to the source the spray liquid so collected.

ALFRED PAUL, JR.

REFERENCES CITED

The following references are of record in the file of this patent:

UNITED STATES PATENTS

| Number | Name | Date |
|---|---|---|
| 774,279 | Seabury | Nov. 8, 1904 |
| 866,396 | Smith | Sept. 17, 1907 |
| 870,766 | Eaton | Nov. 12, 1907 |
| 883,132 | Goff | Mar. 24, 1908 |
| 1,534,241 | Nichols | Apr. 21, 1925 |
| 1,538,779 | Allgrunn et al. | May 19, 1925 |
| 2,216,238 | Spangler | Oct. 1, 1940 |
| 2,264,201 | Findlay | Nov. 25, 1941 |

FOREIGN PATENTS

| Number | Country | Date |
|---|---|---|
| 456,456 | Great Britain | Nov. 10, 1936 |
| 312,677 | Germany | June 2, 1919 |